United States Patent [19]

Nedstedt

[11] Patent Number: 5,081,820
[45] Date of Patent: Jan. 21, 1992

[54] METHOD AND AN ARRANGEMENT FOR THE APPLICATION OF AN END PLATE TO A PACKING CONTAINER BODY

[75] Inventor: Ulf Nedstedt, Eslöv, Sweden

[73] Assignee: Aktiebolaget Profor, Lund, Sweden

[21] Appl. No.: 442,470

[22] Filed: Dec. 1, 1989

Related U.S. Application Data

[63] Continuation of Ser. No. 260,075, Oct. 20, 1988, abandoned.

[30] Foreign Application Priority Data

Nov. 5, 1987 [SE] Sweden ................... 8704322

[51] Int. Cl.⁵ .................. B65B 43/00; B29C 57/10
[52] U.S. Cl. ........................... 53/456; 53/242;
53/281; 53/284; 53/471; 53/563; 425/388;
493/108; 493/85
[58] Field of Search ............ 493/85; 425/388;
264/268, 571; 156/69; 53/456, 471, 563, 281,
284, 242

[56] References Cited

U.S. PATENT DOCUMENTS

| 2,888,861 | 6/1959 | Meyer-Jagenberg | 93/39.1 |
|---|---|---|---|
| 2,899,789 | 8/1959 | Smith | 493/108 |
| 3,493,640 | 2/1970 | Richie | 425/388 |
| 4,129,467 | 12/1989 | Knutsson | 156/84 |
| 4,295,838 | 10/1981 | Richards et al. | 493/109 |
| 4,619,636 | 10/1986 | Bogren | 493/109 |

FOREIGN PATENT DOCUMENTS

| 019646 | 5/1979 | European Pat. Off. . |
| 032820 | 1/1981 | European Pat. Off. . |
| 074343 | 8/1982 | European Pat. Off. . |
| 1586180 | 3/1970 | Fed. Rep. of Germany . |
| 424166 | 7/1982 | Sweden . |

Primary Examiner—Frederick R. Schmidt
Assistant Examiner—Jack Lavinder
Attorney, Agent, or Firm—Burns, Doane, Swecker & Mathis

[57] ABSTRACT

A method for applying an end plate to a container body includes applying a heated end blank made of deformable material to one end of the container body and creating a pressure difference between the two sides of the end blank to seal the edges of the end blank to the edges of the container body. The apparatus for applying an end plate to a container body includes a jacket having a chamber into which the container body can be fitted. A vacuum source is provided at one end of the jacket and a lid or clamping device is located at the opposite end of the jacket. The chamber into which the container body is fitted is not as deep as the container body so that when the container body is fitted into the chamber, the upper edges of the container body extend above the surface of the jacket. In that, the end blank can be applied to the container body and thereafter, the clamping device is used to clamp the end blank between the upper edge of the jacket and the clamping device. A device is then utilized to create a pressure differential between opposite sides of the end blank to seal the end blank to the container body.

17 Claims, 2 Drawing Sheets

5,081,820

METHOD AND AN ARRANGEMENT FOR THE APPLICATION OF AN END PLATE TO A PACKING CONTAINER BODY

This application is a continuation of application Ser. No. 07/260,075, filed Oct. 20, 1988 now abandoned.

FIELD OF THE INVENTION

The present invention relates to a method for the application of an end plate to a packing container body and an apparatus for the realization of the method.

BACKGROUND OF THE INVENTION

In the manufacture of packing containers of the type which comprise a container body and an end plate or the like made of a separate piece of material and attached to the container, the application of this loose end plate to the packing container body represents a stage in the manufacture. It is also possible for several loose end plates to be applied, e.g. when the packing container body is tubular and is to be provided with two end plates. The application and attachment of the loose packing container components can be done, of course, in a number of different ways, but it must be common to all, that after the components have been aligned in a correct mutual position the components are assembled and joined to one another by subjecting them to a greater or lesser joining pressure. The method of joining will depend, of course, on the type of material the components are made of.

In many different kinds of packing containers of the nonreturnable type, for e.g. food products, a packing material is used which wholly or partly consists of thermoplastic material. The thermoplastic material may possibly be in the form of outer layers of a laminated material which also comprises layers or other types of plastics, paper or aluminium foil. It is a common feature of such packing materials that they can be heat-sealed to one another by heating the required parts of the thermoplastic layers to a softening or sealing temperature, whereafter the parts are pressed together and allowed to cool while the compression continues.

The aforementioned type of seals between layers of thermplastic material will be very strong and liquid-tight, but in order to guarantee the desired liquid-tightness, even in the case of not wholly smooth material surfaces, a relatively large compression force is needed, which requires stoutly dimensioned heat sealing jaws, force application devices and machine frame. Difficulties in achieving a sufficiently large and uniform sealing force and a uniform and homogeneous heating are encountered also in packing containers of a geometric design which makes the sealing location not easily accessible, e.g. round or sharp-cornered packing containers of relatively small dimensions. On application of the profiled packing container components, e.g. end plates on sleeve-like packing container bodies, it is necessary, moreover, to preform the end plates so that they obtain the desired profile, e.g. with an edge embracing the edge of the packing container body. This also makes it necessary to ensure that prior to the application and sealing, the end plates and the packing container body are oriented and aligned accurately in relation to one another.

OBJECTS AND SUMMARY OF THE INVENTION

It is an object of the present invention to provide a method for the application of a lid or an end plate to a packing container body which avoids the abovementioned difficulties and disadvantages.

It is a further object of the present invention to provide a method for applying an end plate to a packing container body which does not require large expenditures of force, which does not create reaction forces which cause asymmetrical loads, and which does not in some other manner negatively influence the process.

It is a further object of the present invention to provide a method of application which eliminates the need for a preformed end blank and which simplifies the necessary supply of heat when thermoplastic material is used.

It is a further object of the present invention to provide a method for applying an end plate to a packing container body, this method producing tight, strong seals, even if the fit between components, or the surface quality of the components, is not perfect.

These and other objects have been achieved in accordance with the invention in that a method for applying an end plate to a packing container body has been given the characteristic that an end blank is placed at the open end of the packing container body and that a pressure difference is provided between the two sides of the end blank so that the end blank is pressed against, and can be sealed to, the packing container body.

By using a gaseous or liquid pressure medium for forming and pressing the end blank against the end of the packing container body, a uniform pressure distribution is achieved which is adapted to possible irregularities on the container components. Sealing jaws or other pressure application devices thus become unnecessary, which not only eliminates the problem of outwards directed reaction forces, but also prevents any form of asymmetrical imposition of force. By using a plane end blank of thermformable plastic material not only is the preforming of the blank eliminated, but also the need for an accurate alignment and centering of the end blank in relation to the packing container body, as also eliminated and at the same time as the whole forming work, as well as the application and sealing of the end plate heated to softening temperature can be done continuously without a simultaneous supply of heat, which makes for a quicker and less complicated method of operation.

It is a further object of the present invention to provide a simple and reliable arrangement for applying an end plate to a packing container body in accordance with the method according to the invention.

This has been achieved in accordance with the invention in that an arrangement of the type described in the introduction has been given the characteristic that it comprises an air-tight chamber, a pressure or vacuum source connectable to the chamber and a clamping device maneuverable so as to rest against an open end of the chamber.

Because the arrangement in accordance with the invention makes use of pressure fluid in order to provide the necessary forming and sealing pressure on joining together the packing container components heated previously, the arrangement is of a simple, mechanical design without the heat-sealing jaws, force-application devices and force absorption arrangements such as were necessary previously. The arrangement in accordance with the invention, therefore, will be appreciably smaller dimensions than earlier arrangements of the same type. The arrangement in accordance with the invention, moreover, makes it possible to apply end plates to packing containers which are wholly or partly filled with contents.

BRIEF DESCRIPTION OF THE DRAWINGS

A preferred embodiment of the method as well as of the arrangement in accordance with the invention will now be described in greater detail with references to the attached drawings, which only show the parts indispensable for an understanding of the invention and wherein.

DETAILED DESCRIPTION OF THE PREFERRED EMBODIMENTS

Figure 1:
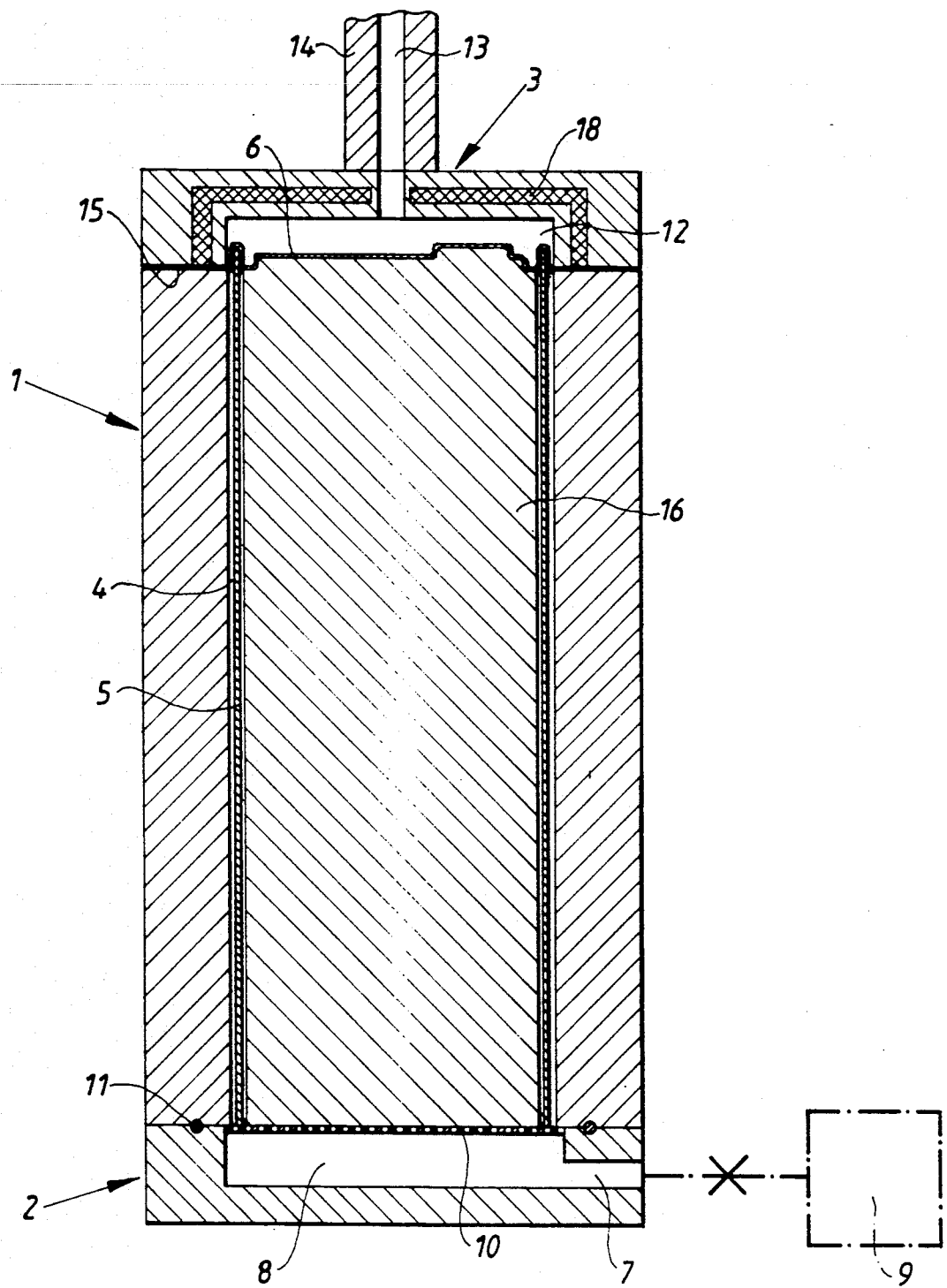
FIG. 1 is a longitudinal cross-sectional view of an embodiment of the arrangement in accordance with the invention as designed for the application of an end plate to an empty sleevelike packing container body.

The arrangement in accordance with the invention comprises a sleevelike jacket 1, which at its one end has a bottom part 2 and at its other end a lid or a clamping device 3. Inside the jacket 1 a chamber 4 is provided whose shape substantially corresponds to the shape of a packing container body 5 which is to be provided with an end plate 6 by means of the arrangement in accordance with the invention. The inside width of the chamber 4 is slightly larger than the corresponding dimension of the packing container body 5, which will be explained more fully hereinafter.

The bottom part 2 of the arrangement is substantially cup-shaped and comprises a duct 7 to make possible a connection between the centrally situated recess 8 of the bottom part 2 and a vacuum source 9 of conventional type indicated in FIG. 1. The upper side of the bottom part 2 facing towards the jacket 1 is substantially plane and comprises a gas-permeable supporting element 10 which covers the recess 8. The supporting element 10 may be designed e.g. as a perforated plate. The bottom part 2 is provided with sealing means 11 e.g. an O-ring for gas-tight connection to the lower end of the jacket 1.

At the opposite, upper end of the jacket 1 a clamping device 3 is provided which like the bottom part 2 is substantially cup-shaped and comprises a recess 12 which is connected to the surrounding atmosphere via a duct 13. The lid or the clamping device 3 moreover has a centrally situated fastening 14 which extends upwards from the clamping device 3 and connects the same to a maneuvering device (not shown) of the conventional type, e.g. a hydraulic or pneumatic piston and cylinder unit. The clamping device 3 with the help of this, on the one hand, can be pressed against the upper end of the jacket 1, as shown in FIG. 1, and can be lifted, on the other hand, to a distance from the jacket 1. When the clamping device 3 is pressed against the upper end of the jacket 1, the peripheral edge of the end plate 6 is clamped at the same time in an air-tight manner between an annular contact surface 15 on the clamping device 3 facing downwards and the corresponding upper end surface of the jacket 1 facing upwards.

The supporting element 10 of the bottom part 2 beside the packing container body 5 also carries a mandrel 16 arranged centrally in the chamber 4 of the jacket 1, whose upper end is profiled and located at the upper, openable end of the chamber 4, that is to say substantially on a level with the contact surface 15 of the clamping device 3, when the clamping device 3 is in the active position shown in FIG. 1. The upper, profiled end surface of the mandrel 16 is of a shape corresponding to the desired shape which the end plate or the end blank 6 is to obtain. The mandrel 16, like the chamber 4, has a cross-section which corresponds to the cross-section of the packing container body 5 which is to be processed, but which is slightly smaller than the inner dimension of the packing container body 5. The width dimension of the mandrel 16 is 1-3% smaller than the corresponding inside dimension of the packing container body 5. In a corresponding manner, the inside width dimension of the chamber 4 is 1-3% greater than the corresponding outside dimension of the packing container body. Consequently on both sides of the packing container wall an air gap results which, in the case of the package sizes generally used, amounts to between 0.5 and 3 mm, which has been found to function satisfactorily. The mandrel 16 thus has no supporting function for the packing container body, but is merely intended to give the end plate 6 the desired profile. If the end plate is to be plane the mandrel 16, therefore, can be excluded.

Figure 2:
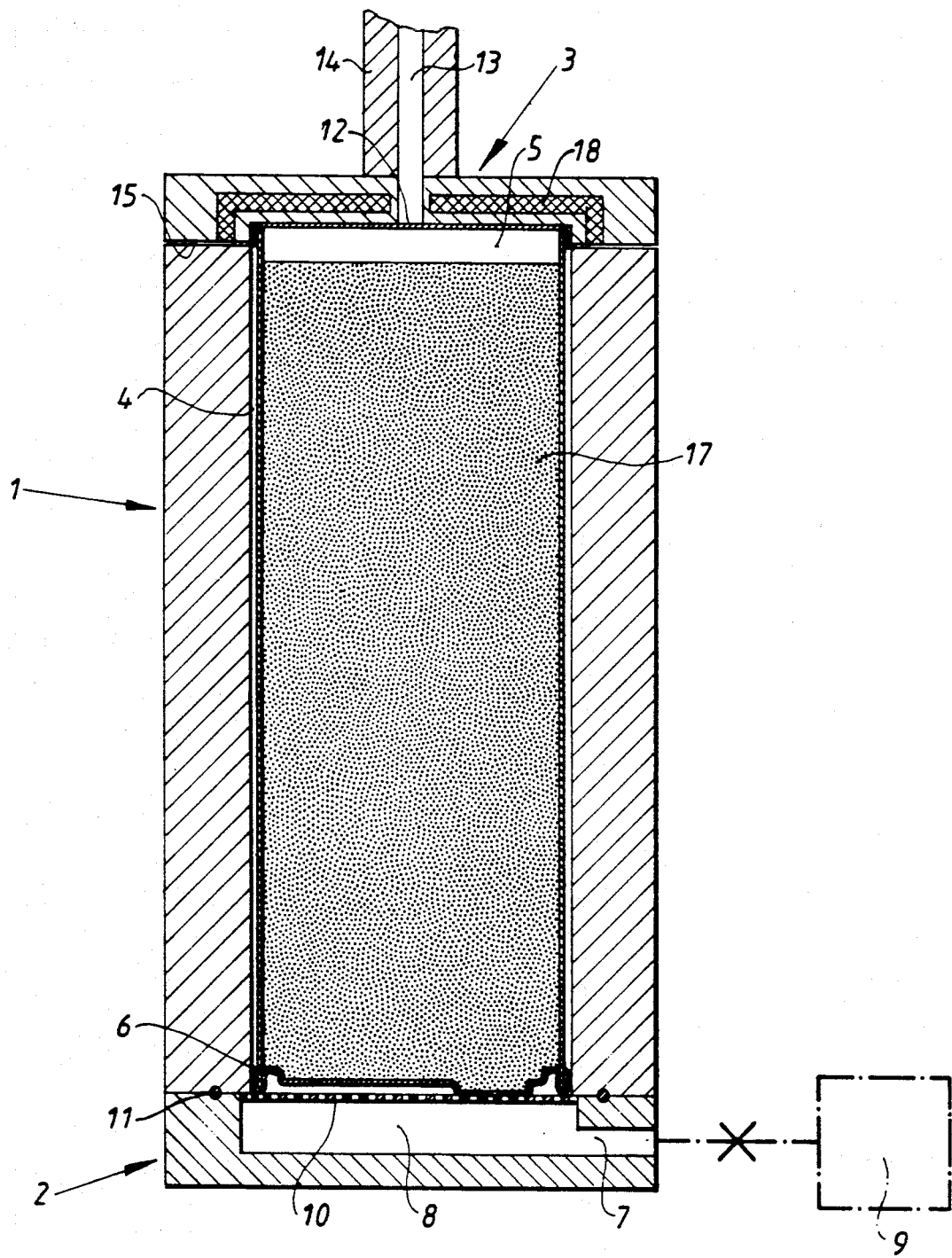
FIG. 2 is a longitudinal cross-sectional view of the arrangement in accordance with the invention for the application of an end plate to a packing container body filled with contents.

The arrangement in accordance with the invention shown in FIG. 2 is intended for the application of a second end plate 6 to a packing container filled with contents 17. The mandrel 16 in this case is left off and its place is taken instead wholly or partly by the liquid contents 17. The play between the outside of the packing container body 5 and the inside wall of the chamber 4 is substantially the same as in the arrangement according to FIG. 1. The other parts of the arrangement shown in FIG. 2 are similar to those shown in FIG. 1.

When the arrangement in accordance with the invention is used to apply in accordance with the method according to the invention an end plate to a packing container body, the arrangement according to the invention at first is in its open position. That is to say, the clamping device or the lid 3 has been removed from the jacket 1 with the help of the fastening 14 so that the upper end of the chamber 4 is laid open and is in contact with the surrounding atmosphere. A packing container body 5 of the size and cross-sectional form to which the chamber 4 is adapted is then placed into the chamber so that the bottom end of the body 5 rests on the supporting element 10 on the bottom part of the chamber. The height of the chamber 4, as mentioned earlier, is somewhat less than the height of the packing container body 5 and the upper edge zone of the packing container body, therefore, will project a little (2-5 mm) above the upper end surface of the jacket 1. If the mandrel 16 is to be used it can be placed centrally into the chamber 4 either before the packing container body 5, at the same time as the packing container body 5 or after the packing container body 5. The mandrel 16 too is of such a length than when resting on the supporting means 10 it extends with its upper, profiled end surface a little above the upper end of the jacket 1. On placing the packing container body and possibly the mandrel 16 into the chamber, the connection between the recess 8 of the bottom part and the vacuum source is broken, e.g. by means of a valve (not shown) in the duct 7.

An end blank which is to form the end plate 6 of the packing container is now placed on top of the edge of the packing container body 5 extending over the top of the jacket 1. The end blank 6 preferably consists of a thermoplastic material which can be thermoformed and heat-sealed to the top end of the packing container body 5 which also consists of thermoplastic material or, in any case, comprises external layers of thermoplastic material. The end blank 6 appropriately has been heated previously with the help of conventional means, not shown here, to a softening temperature suitable for the particular thermoplastics. Appropriately the upper edge zone of the packing container body, that is to say the part which extends above the top end of the chamber 4, has also been heated in advance to a sealing temperature suitable for the particular type of thermomplastics, e.g. 120°-130° C. for polythene. The heating may be done with hot air or by means of any suitable source, e.g. IR-heat.

The clamping device 3 or the lid is placed on the top of the jacket 1 in such a manner that the peripheral edge of the end blank 6 will be fixed between the clamping device 3 and the jacket 1. The contact surface 15 is applied with such a force that the joint between the clamping device 3 and the jacket 1 will be gas-tight. The chamber 4 enclosed by the jacket 1 (with bottom part 2) and the clamping device 3 consequently will be wholly gas-tight and divided into two parts, an upper section above the end blank 6 and a lower section below the end plate 6. The upper chamber section located in the clamping device 3 (that is to say the recess 12) communicates with the surrounding atmosphere via the duct 13 which possibly may be provided with a valve. The lower section of the chamber 4 now is connected via the duct 7 to the vacuum source 9 which via the recess 8 in the bottom part 2 and the perforated supporting element 10 extracts the air from the section of the chamber 4 situated below the end blank 6 so that a vacuum results on both sides of the jacket wall of the packing container body 5. If the arrangement in accordance with the invention, as shown in FIG. 1, is provided with a mandrel 16 present in the tubular packing container body 5, only the narrow gaps which exist between the mandrel 16 and the inside of the packing container body 5 and between the jacket 1 and the outside of the packing container body 5 need be evacuated. This can be done very rapidly, since the gap widths only amount to a few millimeters and the total volume which is to be evacuated, therefore, very small.

As a result of the vacuum in the chamber 4, that is to say the section of the enclosed space situated below the end blank 6, the surrounding atmosphere will press via the duct 13 the plate blank 6 heated to softening temperature accurately against the upper profiled surface of the mandrel 16 and the projecting free edge zone of the packing container body 5. The external and internal thermoplastic layers of the packing container body 5 have been heated in the edge zone, that is to say the future sealing region to the sealing temperature, and the end plate 6 likewise heated to sealing temperature, therefore, will be sealed in a liquid-tight manner together with the edge zone of the packing container body internally as well as externally. The upper, profiled surface of the mandrel 16 is manufactured from a material which is not sealable to the end plate 16, but the latter instead will be accurately shaped and profiled so that it obtains the same shape as the upper end surface of the mandrel 16, e.g. a shape which comprises stiffening ribs or weakened, openable areas.

When the sealing and forming of the end blank or end plate 6 has taken place and the thermoplastic material has been allowed to cool down slightly (the mandrel 16 and/or the jacket may possibly be cooled) the clamping device 3 is removed again, and the packing container body 5 with the end plate 6 fixed to it can be lifted out of the jacket 1. The part previously fixed between the top end of the jacket 1 and the clamping device 3 now forms a small rim projecting from the end plate 6 which, however, can be removed in conventional manner, e.g. by punching or clipping. The packing container is now ready for filling with the desired contents. The packing container should be provided with a base which can be done in conventional manner or in accordance with the method according to the invention.

When the bottom too is to be applied in accordance with the method according to the invention, the packing container turned upside-down, wholly or partly filled with contents, is placed in an arrangement according to the invention as shown in FIG. 2. The arrangement is identical with the arrangement shown in FIG. 1, apart from the mandrel 26 here being left out, so that the packing container in upside-down condition can be lowered without hindrance into the chamber 4 of the jacket 1. The supporting element 10 appropriately may be given a profile which corresponds to the profile of the end plate 6 (this is not shown, though, in the Fig.). Subsequently the procedure is as described earlier, that is to say an end plate which is to form the base of the packing container is heated and placed over the heated, projecting edges zone of the packing container body. When the clamping device 3 has been placed in seal-forming contact against the upper end of the jacket 1 with the peripheral region of the end plate 6 located therebetween, the air in the chamber 4 is evacuated with the help of the vacuum source 9, as a result of which the soft thermoplastics in the end plate 6 will be forced to lie against the outside of the free edge zone of the packing container body 5 so that a liquid-tight seal arises between them. Since the vacuum on application of the base onto a liquid-filled packing container will be effective only along the outside of the packing container body 5 the central portion of the end plate 6 will remain plane. However an impression of the said portion may be achieved to a greater or lesser extent by providing the inside surface of the clamping device 3 which projecting profiled portions, which create the desired pattern in the base end plate of the packing container.

The method as well as the arrangement in accordance with the invention can be modified in a number of ways within the scope of the concept of the invention. It is possible, for example, to achieve the desired pressure difference between the two sides of the end plate 6 in a different manner, e.g. by leaving out the vacuum source 9 and instead connecting the recess 8 with the surrounding atmosphere, and connecting the duct 13 to a pressure source, which, for example may operate with hot air so as to provide at the same time a supplementary supply of heat to the thermoplastic material of the end plate 6. This method, however, has been found to give a slightly worse result and to cause greater stresses on the material, wherefore, at least in more complicated forming and sealing operations, the firstnamed method is preferred. The time of the application of vacuum (alternatively pressure) also may be chosen according to need, and it is quite possible, for example, to commence the evacuation of air from the chamber 4 already before the end plate 6 has been placed in position.

The heating of the thermoplastic material in the end plate 6 also can be done in a number of different ways and at a different junctures. The end plate 6 may be heated with the help of conventional means, such as hot air or IR-radiation, prior to application to the upper edge zone of the packing container 5. To prevent the plate blank from cooling down too soon, the lid 3 possibly may be heated to above room temperature, e.g. 50°-80° C., by means of a built-in heating element 18 of the electric resistance type. For corresponding reasons this may also be done, of course, in the upper edge region of the jacket 1 which is not shown, though, in the Fig. The thermoplastic surface layers in the upper edge zone of the packing container body 5 are heated appropriately with hot air directly before application of the end plate 6, but here too, of course, other methods of heating are conceivable. It is also conceivable to use other sealing methods such as a strand of adhesive (possibly thermoplastic) applied along the edge zone and/or the edge region of the end blank.

The placing of the packing container body 5 into the chamber 4 can take place without any centering or other alignment of the packing container body in relation to the jacket 1 being necessary, since the vacuum has a centering effect on the packing container body 5, and ensures that the same ends up in centered position, so that the gaps between the packing container body 5 and the mandrel 16 or the jacket 1 will always be of equal size. The placing of the end plate 6 is likewise not critical, since it is wholly plane and is a little overdimensioned so as to make possible the fixing between the contact surface 15 of the clamping device 3 and the upper end of the jacket 1. As a result the method of application in accordance with the invention is both quick and simple to perform, and at the same time the necessary accuracy is automatically achieved.

The method in accordance with the invention makes it possible to avoid the large compression forces, which previously were unavoidable in the sealing of packing container components to each other with the help of jaw systems and other mechanical pressure devices. The arrangement in accordance with the invention completely lacks external pressure application devices, and external forces of any significance on the whole do not occur, so that the complicated and stoutly dimensioned stands of previous sealing arrangements become unnecessary. Apart from the vacuum source 9, only one external arrangement is required, namely the device for maneuvering the clamping device 3. This arrangement, however, has to be dimensioned only for the weight of the clamping device, since any pressing of the clamping device 3 against the jacket 1 during he operation is not required as the necessary force is provided by the vacuum in the chamber 4.

The method in accordance with the invention of heating the components which are to be formed and/or heat-sealed to one another in advance and individually makes possible a substantially increased working rate, since the heating time will not be confined to the time when the components are in contact with the jacket 1 or the lid 3. The heated end plate material, however, is simple to form so as to provide a complete joint and seal against the heated end of the packing container body, and practical tests have shown that the tightness of the seal will be very good and fully satisfactory also for aseptic packing containers which, however, require the package and end material to be of the gas-tight type, e.g. with a barrier layer of aluminum or ethylvinyl alcohol (EVOH). The absence of heat-sealing jaws proper also makes possible a simpler and more reliable arrangement.

While this invention has been illustrated and described in accordance with a preferred embodiment, it is recognized that variation and changes may be made and equivalents employed herein without departing from the invention as set forth in the claims.

What is claimed is:

1. A method for sealing an end plate to a packing container body, comprising the steps of:
    enclosing a container body in a jacket having a chamber with one end of the container body projecting through an opening in the chamber, said jacket having a bottom part connected to a lower end thereof, said bottom part having a centrally situated recess and a duct for connecting the centrally situated recess to a source of vacuum, said bottom part including a perforated supporting element that extends across the centrally situated recess for supporting the container body within the chamber;
    placing a thermoplastic end blank over said end of the container body and across the opening;
    applying a cover over the opening to fix a peripheral edge of the end blank between the cover and the jacket;
    establishing a fluid-tight seal between the cover and the jacket;
    heating the end blank to a softening temperature; and
    pressing the softened end blank into sealing engagement with said end of said container body by drawing a vacuum in the chamber while maintaining the interior of the cover at a substantially greater pressure, whereby the end blank is sealed to said end of the container body as a result of the vacuum drawn in the chamber, said vacuum being drawn through the duct, through the centrally situated recess in the bottom part and through the perforations in the supporting element.

2. The method according to claim 1, and including placing a mandrel in the container body before placing the end blank over the end of the container body, the mandrel having regions of various spacing from the end blank, whereby upon drawing a vacuum, the end blank is shaped by the regions on the mandrel.

3. The method according to claim 1, and including the step of heating said one end of the container body prior to drawing a vacuum.

4. The method according to claim 1, and including the step of at least partially filling the packing container body with contents prior to placing the end blank on said one end of the packing container body.

5. The method according to claim 1, including venting the interior of the cover to the atmosphere to maintain the interior of the cover at a substantially greater pressure while drawing a vacuum in the chamber.

6. The method according to claim 1, including the step of applying heat to the end blank while the peripheral edge of the end blank is fixed between the cover and the jacket, said step of applying heat being carried out by activating a heating element that is built into the cover.

7. The method according to claim 1, including the step of communicating the interior of the cover with the atmosphere while the peripheral edge of the end blank is fixed between the cover and the jacket.

8. Apparatus for applying a thermoplastic end plate to a packing container body that has an open end comprising:
- chamber means for receiving a packing container body, said chamber means having an opening for exposing the open end of a container body in the chamber means, said chamber means including a jacket having a chamber for receiving the packing container body and a bottom part connected to a lower end of the jacket, said bottom part having a centrally situated recess formed therein and a duct, said bottom part including a supporting element that extends across the centrally situated recess for supporting the packing container within the body, said supporting member having a plurality of perforations extending therethrough for communicating the chamber in the jacket with the centrally situated recess in the bottom part;
- a cover for the opening, said cover having a clamping surface spaced outwardly from said opening and positioned to cooperate with said chamber means to form a fluid-tight seal when an end blank is clamped between the claping surface and said chamber means and to fix a peripheral edge of the end blank between the clamping surface and the chamber means, said cover also having an inner surface that is recessed with respect to said clamping surface to define a recess in the cover, said apparatus being configured to permit the open end of the container body to extend into the recess and to permit an end blank to be positioned over said open end of the container body and pressed onto said open end of the container body by the inner surface of the cover;
- means for heating the end blank while the end blank is clamped against the chamber means; and
- means for drawing a vacuum in the interior of said chamber means to deform a heated end blank that is clamped between the clamping surface and the chamber means, thereby causing the end blank to be sealed to the open end of the packing container body, said duct connecting the centrally situated recess in the bottom part to the means for drawing a vacuum so that a vacuum can be drawn through the duct, through the centrally situated recess in the bottom part and through the perforations in the supporting element.

9. The apparatus according to claim 8, and including supporting means extending across the interior of the chamber for supporting the packing container body when the packing container body is positioned in the chamber.

10. The apparatus according to claim 8, wherein said chamber means adjacent said opening has a substantially planar surface, said clamping surface being substantially planar, whereby an end plate may be effectively clamped between said surfaces.

11. The apparatus according to claim 8, and including a mandrel that is adapted to be positioned in the interior of the packing container body when the packing container body is positioned in the chamber, said mandrel having an end face that is non-planar and that is adapted to contact the side of the end blank that faces the interior of the container body.

12. The apparatus according to claim 8, wherein said means for heating is an integral part of and is built into said cover so that the position of said heating means is fixed with respect to said cover.

13. The apparatus according to claim 8, wherein said chamber means includes a jacket having a perforated supporting means located at a lower end thereof for supporting the packing container body.

14. The apparatus according to claim 8, wherein said cover includes a duct for communicating the recess in the cover to the atmosphere.

15. A method for sealing an end plate to a packing container body, comprising the steps of:
- enclosing a container body in a jacket having a chamber with one end of the container body projecting through an opening in the chamber, said jacket having a bottom part connected to a lower end thereof, said bottom part having a centrally situated recess and a duct for connecting the centrally situated recess to a source of vacuum, said bottom part including a perforated supporting element that extends across the centrally situated recess for supporting the container body within the chamber;
- placing a thermoplastic end blank over the end of the container body and across the opening so that the end blank rests on a top edge of the end of the container body;
- applying a cover over the opening to fix a peripheral edge of the end blank between the cover and the jacket;
- establishing a fluid-tight seal at a joint between the cover and the jacket;
- heating the end blank to a softening temperature; and
- sealing the softened end blank to the container body by drawing a vacuum in the chamber while maintaining the interior of the cover at a substantially greater pressure, whereby the end blank is sealed to the end of the container body, said step of drawing a vacuum in the chamber including drawing a vacuum through the duct, through the centrally situated recess in the bottom part and through the perforations in the supporting element.

16. The method according to claim 15, including the step of applying heat to the end blank while the peripheral edge of the end blank is fixed between the cover and the jacket, said step of applying heat being carried out by activating a heating element that is built into the cover.

17. The method according to claim 15, including the step of communicating the interior of the cover with the atmosphere while the peripheral edge of the end blank is fixed between the cover and the jacket.

* * * * *